US011216357B2

(12) United States Patent
Yim (10) Patent No.: US 11,216,357 B2
(45) Date of Patent: Jan. 4, 2022

(54) OPEN SOURCE SOFTWARE TESTING

(71) Applicant: Google LLC, Mountain View, CA (US)

(72) Inventor: Keun Soo Yim, San Jose, CA (US)

(73) Assignee: Google LLC, Mountain View, CA (US)

( * ) Notice: Subject to any disclaimer, the term of this patent is extended or adjusted under 35 U.S.C. 154(b) by 5 days.

(21) Appl. No.: 16/609,410

(22) PCT Filed: Feb. 22, 2018

(86) PCT No.: PCT/US2018/019200
§ 371 (c)(1),
(2) Date: Oct. 29, 2019

(87) PCT Pub. No.: WO2019/117982
PCT Pub. Date: Jun. 20, 2019

(65) Prior Publication Data
US 2020/0104248 A1 Apr. 2, 2020

Related U.S. Application Data

(60) Provisional application No. 62/599,526, filed on Dec. 15, 2017.

(51) Int. Cl.
*G06F 11/36* (2006.01)
*G06F 8/65* (2018.01)
(52) U.S. Cl.
CPC .......... *G06F 11/3688* (2013.01); *G06F 8/65* (2013.01); *G06F 11/3604* (2013.01); *G06F 11/3692* (2013.01)
(58) Field of Classification Search
None
See application file for complete search history.

(56) References Cited

U.S. PATENT DOCUMENTS 9,032,371 B2 * 5/2015 Hansson ............. G06F 11/3692
717/124
9,317,254 B1 * 4/2016 Yim ...................... G06F 8/447
(Continued)

OTHER PUBLICATIONS

Ziftci, "Who Broke the Build? Automatically Identifying Changes That Induce Test Failures In Continuous Integration at Google Scale", 2017, IEEE/ACM 38th conference (Year: 2017).*
(Continued)

*Primary Examiner* — Hossain M Morshed
(74) *Attorney, Agent, or Firm* — McDonnell Boehnen Hulbert & Berghoff LLP (57) ABSTRACT

Methods, systems, and apparatus, including computer programs encoded on a computer storage medium, for testing open source software are disclosed. In one aspect, a method includes the actions of receiving, from a user device and by a presubmit check server system that is configured to perform presubmit checks on system software code updates, a system software code update and a request to perform a presubmit check on the system software code update. The actions further include requesting, from a system software code server system that is configured to store system software code, presubmit check code. The actions further include receiving, from the system software code server system, a presubmit check code module. The actions further include executing the presubmit check code module against the system software code update. The actions further include providing a report that indicates results of the presubmit check code module execution against the software code update.

20 Claims, 4 Drawing Sheets

(56) References Cited

U.S. PATENT DOCUMENTS

| | | | | |
|---|---|---|---|---|
| 2014/0053138 | A1* | 2/2014 | Yassin | G06F 11/3672 |
| | | | | 717/126 |
| 2016/0321067 | A1* | 11/2016 | Harrison | G06F 8/60 |
| 2017/0034023 | A1* | 2/2017 | Nickolov | H04L 43/0817 |
| 2019/0179735 | A1* | 6/2019 | Krasko | G06F 11/3688 |
| 2020/0104248 | A1* | 4/2020 | Yim | G06F 11/3692 |

OTHER PUBLICATIONS

Shi, "Optimizing Test Placement for Module-Level Regression Testing", 2017, IEEE/ACM 39TH conf (Year: 2017).*

Memon, "Taming Google-Seale Continuous Testing", 2017, IEEE/ACM 39th conf (Year: 2017).*

StackOverflow, "Should unit test classes be kept under version control with the rest of the code?", 2008, Stack Overflow at https://stackoverflow.com/questions/115116/should-unit-test-classes-be-kept-under-version-control-with-the-rest-of-the-code (Year: 2008).*

Elbaum, "Techniques for Improving Regression Testing in Continuous Integration Development Environments", 2014, ACM (Year: 2014).*

StackOverflow, "Should unit test classes be kept under version control with the rest of the code?", 2008, Published at https://stackoverflow.com/questions/115116/should-unit-test-classes-be-kept-under-version-control-with-the-rest-of-the-code (Year: 2008).*

Ziftci, "Who Broke the Build? Automatically Identifying Changes That Induce Test Failures In Continuous Integration at Google Scale", 2017, IEEE/ACM (Year: 2017).*

Shi, "Optimizing Test Placement for Module-Level Regression Testing", 2017, IEEE/ACM (Year: 2017).*

PCT International Search Report and Written Opinion issued in International Application No. PCT/uS2018/019200, dated Jul. 11, 2018, 21 pages.

'testing.googleblog.com' [online] "Presubmit and Performance," Marc Kaplan, Sep. 18, 2008 [retrieved on Jun. 26, 2018] Retrieved from Internet: URL<https://testing.googleblog.com/2008/09/presubmit-and-performance.html> 5 pages.

PCT Written Opinion in International Appln. No. PCT/US2018/019200, dated Feb. 17, 2020, 7 pages.

Agte, Parag, "QA & Dev Teams in Agile Sprints—Together or Separate?" https://www.emtec.digital/think-hub/blogs/qa-dev-teams-in-agile-sprints/, Feb. 6, 2018, 5 pages.

* cited by examiner

OPEN SOURCE SOFTWARE TESTING

CROSS-REFERENCE TO RELATED APPLICATIONS

This application is a National Stage Application under 35 U.S.C. § 371 and claims the benefit of International Application No. PCT/US2018/019200, filed Feb. 22, 2018, which claims priority to U.S. Application No. 62/599,526, filed Dec. 15, 2017, the disclosures of both are incorporated by reference.

FIELD

This specification relates to software testing.

BACKGROUND

Open source software is computer software with its source code made available to the public to study, change, and distribute for various purposes. Open source software may be developed in a collaborative public manner.

SUMMARY

Open source software development involves the collaboration of many different software developers who may each submit changes to different portions of a software package. Even though the software developers may not be affiliated or employed by the same entity, one entity may, in some instances, take responsibility for maintaining the software and merging updates provided by the different software developers. In order to improve reliability of the software, the maintaining entity may adopt presubmit time checks. The software code repository, or system software code server, may require that developers submit their software to these checking systems before merging any updates with the system software code.

In some implementations, the systems that handle the presubmit checks may also store the presubmit check code. The presubmit check system may be a proprietary system of the maintaining entity, and only authorized developers may be permitted to update the presubmit check code. These developers may not be as familiar with the system software code and the system software code updates that undergo the presubmit tests. Similarly, the developers who provide the system software code updates may not be familiar with the inner workings of the presubmit check system, which may appear as a black box to the developers who provide the system software code updates. If a developer who provides system software code updates would like to implement a new presubmit check, the developer would have to submit a request to one of the authorized developer to create the new presubmit check.

To improve the quality of the presubmit check system, the maintaining entity may reconfigure the system such that the presubmit check code is stored in the same system that stores the system software code. Doing so may make the presubmit check code open source, and the same developers who provide the system software code updates may update the presubmit check code.

To execute a presubmit check, the presubmit check system would pull the necessary presubmit check code from the system that stores the system software code. The presubmit check code may be modularized so that the presubmit check system may only need to pull the presubmit check code modules for the current presubmit check. The presubmit check system may execute, in isolation, the presubmit check code against the system software code update. The presubmit check system may then report the results of the presubmit check to the developer. If the system software code update passed the presubmit check, then the developer may merge the system software code update with the system software code. If the system software code update failed the presubmit check, then the developer may modify the system software code update and resubmit the modified system software update to the presubmit check system.

According to an innovative aspect of the subject matter described in this application, a method for testing open source software includes the actions of receiving, from a user device and by a presubmit check server system that is configured to perform presubmit checks on system software code updates, a system software code update and a request to perform a presubmit check on the system software code update; in response to receiving the request to perform the presubmit check on the system software code update, requesting, by the presubmit check server system and from a system software code server system that is configured to store system software code, presubmit check code; based on requesting the presubmit check code, receiving, by the presubmit check server system and from the system software code server system, a presubmit check code module; executing, by the presubmit check server system, the presubmit check code module against the system software code update; and based on analysis obtained by executing the presubmit check code module against the system software code update, providing, for output, a report that indicates results of the presubmit check code module execution against the software code update.

These and other implementations can each optionally include one or more of the following features. The action of executing, by the presubmit check server system, the presubmit check code module against the system software code update includes executing, in isolation, the presubmit check code module against the system software code update. The action of providing, for output, a report that indicates results of the presubmit check code module execution against the software code update includes providing, for output, a results indicator that indicates a pass, a fail, or a warning and a message string. The presubmit check code module includes a presubmit check script; a presubmit check binary; a presubmit check code that is configured to execute in a sandbox; or a presubmit check library that is configured to implement one or more APIs. The system software code server is configured to receive, from the user device, presubmit check code modules and presubmit check code updates. The system software code stored by the system software code server is open source software code.

The action of executing, by the presubmit check server system, the presubmit check code module against the system software code update includes generating a workflow model that includes multiple vertices that are connected by edges, where each vertex represents a presubmit check and each edge represents a dependency between connected presubmit checks; executing a particular presubmit check; determining that a pass result of the particular presubmit check is probabilistic; and, based on determining that a pass result of the particular presubmit check is probabilistic, executing a subsequent presubmit check that is connected to the particular presubmit check in the workflow model. The action of executing, by the presubmit check server system, the presubmit check code module against the system software code update includes, based on determining that a pass result of the particular presubmit check is probabilistic, providing, for output, the pass result of the particular presubmit check without waiting for a result of the subsequent presubmit check. The action of executing, by the presubmit check server system, the presubmit check code module against the system software code update includes, based on determining that a pass result of the particular presubmit check is probabilistic, providing, for output, the pass result of the particular presubmit check in a portion of a user interface that includes other pass results from other presubmit checks with probabilistic results. The system software code includes software code for an operating system; software code for an application; or software code for a computer programming tool.

Other implementations of this aspect include corresponding systems, apparatus, and computer programs recorded on computer storage devices, each configured to perform the operations of the methods.

The subject matter described in this application may have one or more of the following advantages. The system may improve the security of open source software by creating open source presubmit check code. With more developers able to contribute to the presubmit check code, the presubmit check code may improve and be able to identify potential vulnerabilities in updates to the system software code. The system may be able to save network bandwidth by modularizing the presubmit check code. The system may only need to transmit the necessary presubmit check code modules for the request presubmit check.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
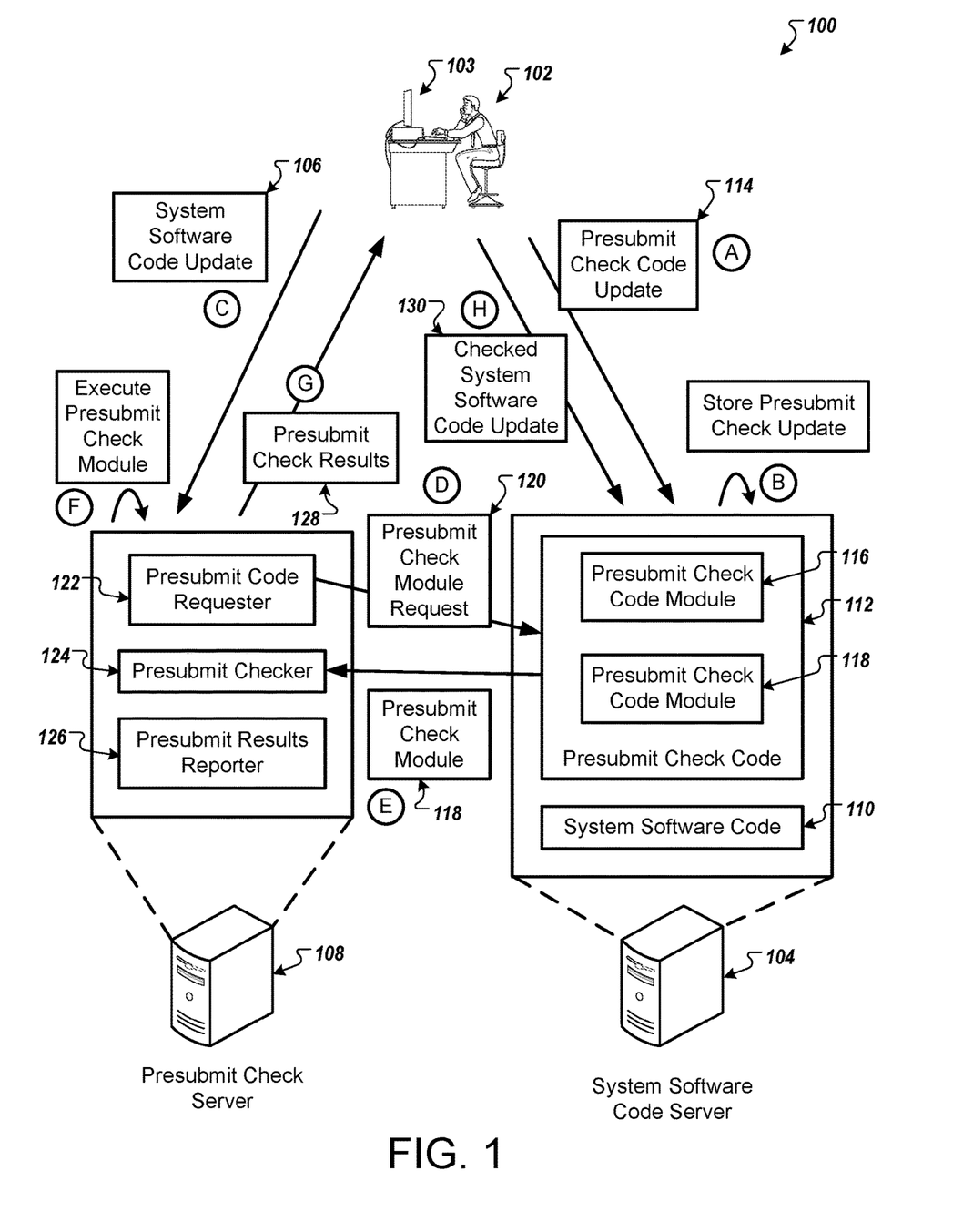
FIG. 1 illustrates an example system for testing open source software.

FIG. 1 illustrates an example system 100 for testing open source software. Briefly, and as described in more detail below, the user 102, and corresponding user device 103, updated a portion of the system software code 106 that is stored in the system software code server 104. Before submitting the updated system software code 106 to the system software code server 104, the user 102, through the user device 103, submits the updated system software code 106 to the presubmit check server 108 for testing. The presubmit check server 108 performs the presubmit check using presubmit check code pulled from the system software code server 104. By accessing presubmit check code pulled from the system software code server 104, the presubmit check server 108 is able to leverage the benefits of open source software for the presubmit check code.

Before submitting the system software code update 106 to the system software code server 104, there are several tests that should be performed on the system software code update 106 before the system software code update 106 merges with the system software code 110. By checking the system software code update 106 before merging the system software code update 106 with the system software code 110, the system 100 is able to analyze functionality of the system software code 100, for example by determining whether the new functionality added with the system software code update 106 works, whether the system software code update 106 breaks any existing functionality of the system software code 110, and/or whether there is a performance impact of the system software code update 106. In other words, the system 100 performs a presubmit check on the system software code update 106 before submitting the system software code update 106 to the system software code server 104.

In some implementations, the system software code 110 is software code for an application. The application may be a native application for execution by an operating system, a web application for execution in a browser, or another type of application. In some implementations, the system software code 110 is software code for an operating system. In some implementations, the system software code 110 is software code for a computer programming tool, for example, a complier.

Submitting the system software code update 106 before merging the system software code update 106 with the system software code 110 saves time and processing power when identifying problems with the system software code update 106. In instances where the system software code update 106 merges with the system software code 110 without submitting the system software code update 106 to the presubmit check server 108, the user 102 or other users may analyze the system software code 110 to identify the location of the error. The problem may be compounded when multiple system software code updates are merged with the system software code 110 because it may be difficult to attribute an error to a particular system software code update.

In the example shown in FIG. 1, the system software code server 104 is the repository for the system software code 110. The system software code server 104 may be a system software code server system that includes one or more computers that may be distributed across multiple geographic locations. The system software code server 104 also stores the presubmit check code 112. By storing the presubmit check code 112, the system 100 allows user 102 and other users to upload updates to the presubmit check code 112. In some implementations, the presubmit check server 108 stores the presubmit check code 112. The presubmit check server 108 may be a system that includes one or more computers that may be distributed across multiple geographic locations. Because the presubmit check server 108 may be a proprietary system that does not allow code changes by the public, only authorized users may be able to update the presubmit check code 112 when the presubmit check server 108 stores the presubmit check code. The limited number of users who update the presubmit check code 112 may not be active in updating the system software code 110. Similarly, the users who update the system software code 110 may not be one of the users who update the presubmit check code 112. By storing the presubmit check code 112 on the system software code server 104 many users may be able contribute and fine tune the presubmit check code 112. These may be the same users who are already familiar with how the system software code 110 functions.

In stage A, the user 102 submits a presubmit check code update 114 to the system software code server 104, in particular by means of the user device 103. The user 102 may be a member of the public who may not be authorized to submit the presubmit check code update 114 to the presubmit check server 108 if the presubmit check server 108 stored the presubmit check code 112. The presubmit check code update 114 may be an update to existing presubmit check code or may be an additional presubmit check code module. For example, the presubmit check code 112 may include presubmit check code module 118 and presubmit check code module 116. The user 102 may provide the presubmit check code update 114, which may be an update to the presubmit check code module 116.

In stage B, the system software code server 104 stores the presubmit check code update 114. The system software code server 104 may store the presubmit check code update 114 by merging the presubmit check code update 114 with an existing presubmit check code module. For example, the presubmit check code update 114 may be an update to part of the presubmit check code module 116. In this instance, the system software code server 104 may overwrite the corresponding portion of the presubmit check code module 116 with the presubmit check code update 114. As another example, the presubmit check code update 114 may be a new presubmit code module. In this instance, the system software code server 104 may add the presubmit check code update 114 as a new presubmit check code module to the presubmit check code 112.

The system software code server 104 may store the presubmit check code 112 modularly. By storing the presubmit check code 112 modularly, the system software code server 104 may only have to transmit the modules needed to execute a presubmit check. By limiting the presubmit check code that is transmitted between the system software code server 104 and the presubmit check server 108, the system 100 may reduce the network bandwidth needed for each presubmit check. When the presubmit check server 108 processes multiple presubmit checks in a short period of time (e.g., a presubmit check each minute), the network bandwidth reduction may be significant. Instead of the system software code server 104 transmitting all or nearly all of the presubmit check code 112 to the presubmit check server 108 for each presubmit check, the system software code server 104 may only need to transmit the presubmit check code modules needed by the presubmit check server 108 to execute the current presubmit check.

In stage C, the user 102 may submit a system software code update 106 to the presubmit check server 108. In some implementations, the user 102 may submit the system software code update 106 to the system software code server 104. The system software code server 104 may determine that the presubmit check server 108 did not check the system software code update 106. In this instance, the software code server 104 may automatically submit the system software code update 106 to the presubmit check server 108. The system software code server 104 may require that the system software code update 106 include data indicating that the presubmit check server 108 analyzed the system software code update 106. In some implementations, the data may be or comprise a signature added to the system software code update 106. In some implementations, the data may be or comprise (e.g., in addition to a signature) a hash of the system software code update 106. The system software code server 104 may apply a similar hash function to the system software code update 106. If the system software code server 104 generates a hash that matches a previously received hash, then the system software code server 104 may determine that the presubmit check server 108 processed and approved the system software code update 106.

In stage D, the presubmit check server 108 transmits a presubmit check module request 120 to the system software code server 104. The presubmit check module request 120 may include data identifying the type of update represented by the system software code update 106. The type of update may include data identifying the portion of the system software code 110 that the system software code update 106 will update. For example, if the system software code update 106 updates the graphical interface portion of the system software code 110, then the presubmit code requester 122 may request a presubmit check code module to check graphical interface code. As another example, if the system software code update 106 updates a driver of the system software code 110, then the presubmit code requester 122 may request a presubmit check code module to check the particular driver.

In stage E, the system software code server 104 may access the requested presubmit check code module. For example, the system software code server 104 may determine that the appropriate presubmit check code module for the system software code update 106 is the presubmit check code module 118. The system software code server 104 may transmit the presubmit check code module 118 to the presubmit check server 108. Because the presubmit check server 108 does not require the presubmit check code module 116, the system software code server 104 may not need to transmit the presubmit check code module 116 to the presubmit check server 108. As noted above, by not transmitting all or nearly all of the presubmit check code 112 to the presubmit check server 108 and/or modularizing the presubmit check code 112, the system 100 saves network bandwidth.

In stage F, the presubmit checker 124 of the presubmit check server 108 executes the presubmit check code module 118 against the system software code update 106. In particular, the presubmit checker 124 executes the presubmit check code module 118 against the system software code update 106 in isolation. The presubmit checker 124 executes the presubmit check code module 118 by performing the presubmit checks included in the presubmit check code module 118. The presubmit checks may include building the system software code update 106. For example, the presubmit checker 124 may apply the system software code update 106 to the corresponding portion of the system software code 110 and generate a binary of the resulting code. The presubmit checker 124 may produce a build error if the system software code update 106 fails the build test. The presubmit checks may include a static analysis of the system software code update 106. For example, the presubmit checker 124 may apply a linter to identify any errors in programming languages, such as stylistic errors. The presubmit checks may include a dynamic analysis of the system software code update 106. For example, the presubmit checker 124 may perform memory leak tests, use performance profiling, and other similar tests based on execution results from executing the system software code update 106 applied or not applied to the system software code 110. The presubmit checks may include an instrumentation analysis of the system software code update 106. For example, the presubmit checker 124 may perform code coverage tests and buffer overflow tests.

The presubmit check module 118 and other presubmit check modules may be implemented in various forms. For example, the presubmit check module 118 may be a script that the presubmit checker 124 interprets. The presubmit check module 118 may be code that is configured to run in a sandbox by the presubmit checker 124. The presubmit check module 124 may be a binary, e.g., native or java, that the presubmit checker 124 executes. The presubmit check module 124 may be a library that the presubmit checker 124 executes to implement a set of APIs. Different presubmit modules of the presubmit check code 112 may be in different formats. For example, presubmit check module 118 may be script and presubmit check module 116 may be a library.

In stage G, the presubmit results reporter 126 generates presubmit check results 128 to provide to the user 102. The presubmit check results 128 may include an indication whether the system software code update 106 passed or failed the presubmit check. The presubmit check results 128 may include a warning that may be in place of a pass or fail. The presubmit check results 128 may also include additional text, such as when the system software code update 106 failed or when the presubmit check results 128 may include a warning.

In instances where the presubmit check results 128 indicate that the system software code update 106 passed the presubmit check, the user 102 may upload the checked system software code update 130 to the system software code server 104, as illustrated in stage H. In this case, the checked system software code update 130 may be the same as the system software code update 106. The checked system software code update 130 may include a signature or other identifier for the system software code server to determine that the presubmit check server 108 checked the checked system software code update 130. The system software code server 104 may merge the checked system software code update 130 with the system software code 110. In instances where the presubmit check results 128 indicate that the software code update 106 failed the presubmit check or indicates a warning, the user may update the system software code update 106 and resubmit the system software code update 106 to the presubmit check server 108.

Figure 2:
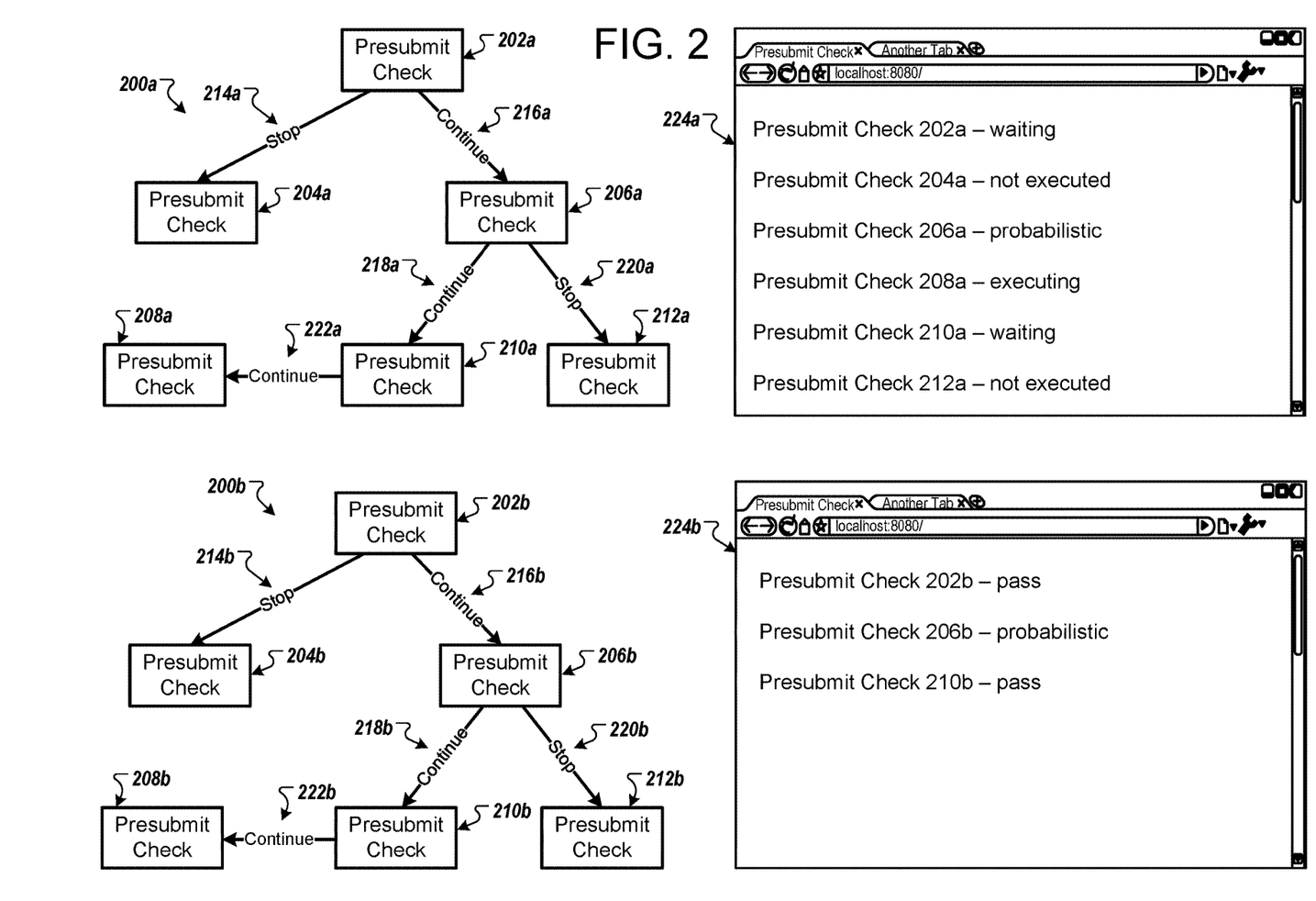
FIG. 2 illustrates example interfaces for displaying results of open software testing.

FIG. 2 illustrates example interfaces 224a and 224b for displaying results of open software testing. Briefly, and as described in more detail below, the example interfaces 224a and 224b represent different reporting styles for a presubmit check server to report and display results to the user who submitted the system software code update. The interfaces 224a and 224b will be described as being output by a computer system comprising one or more computers, for example, the system 100 or the presubmit check server 108 as shown in FIG. 1.

The system generated the workflow model 200a that includes multiple vertices and edges. Each vertex represents a presubmit check and each edge represents a dependency between the two connected vertices. In some implementations, the dependency may be either continue or stop. The system may traverse the continue edge if the presubmit check produces a pass result. The system may traverse the stop edge if the presubmit check produces a fail result. In some implementations, if the presubmit check produces a probabilistic result, then the system traverses the continue edge. A probabilistic result may be one that relies on outside signals or data that the system may not be able to predict during the presubmit check. In other words, the system is unable to determine, based on analyzing the code alone, whether the code will produce an error when executed and/or merged with the system software code. In some implementations, the system may not output the results of presubmit checks in instances where the system traverses the continue edge. By not outputting the results of the presubmit checks in instances where the system traverses the continue edge, the system may delay reporting of those presubmit checks until the system completes the workflow model.

Workflow model 200a and interface 224a illustrate an example technique for handling presubmit checks that output probabilistic results. As illustrated with workflow model 200a and interface 224a, the system executed presubmit check 202a. While the workflow 200a generated a pass result for the presubmit check 202a, the interface 224a may wait to display the results until the workflow 200a is complete. Because the presubmit check 202a generated a pass result, the workflow 200a may traverse edge 216a. Accordingly, the workflow 200a may not traverse edge 214a and not execute the presubmit check 204a.

The result of the presubmit check 206a may be probabilistic. Instead of delaying reporting of probabilistic results, the system may display probabilistic results in the interface 224a early and before completion of the workflow 200a. The workflow 200a may continue the edge 218a by virtue of the probabilistic result of the presubmit check 206a. The workflow 200a may not traverse edge 220a or execute the presubmit check 212a.

The system executes the presubmit check 210a which may generate a pass result. The system may delay displaying the result of the presubmit check 210a because the workflow 200a follows the edge 222a, which is a continue edge, until competition of the workflow 200a. While the system is processing the presubmit check 208a, the interface 224a may indicate that the presubmit check 208a is executing.

The workflow model 200b and interface 224b illustrate another example technique for handling presubmit checks that output probabilistic results. The results of the presubmit checks 202b to 212b may be the same as the results of the presubmit checks 202a to 212a. Additionally, in this example, presubmit check 208b may still be executing. In this instance, the system displays the results of the presubmit checks as the system determines the results. For example, instead of waiting to display the results of the presubmit checks 202b and 210b, the system displays the results in the interface 224b. The system also displays the results of the presubmit check 206b, which is probabilistic.

In some implementations, the interface 224b may be extended to include an additional interface for presubmit check results. This may be in contrast to the interface 224a which may display the presubmit checks with probabilistic results as soon as the system identifies the probabilistic result. In workflow 200b and interface 224b, the system may determine results of presubmit check results in any order and may be merged with the interface 224b without having to add additional results.

Figure 3:
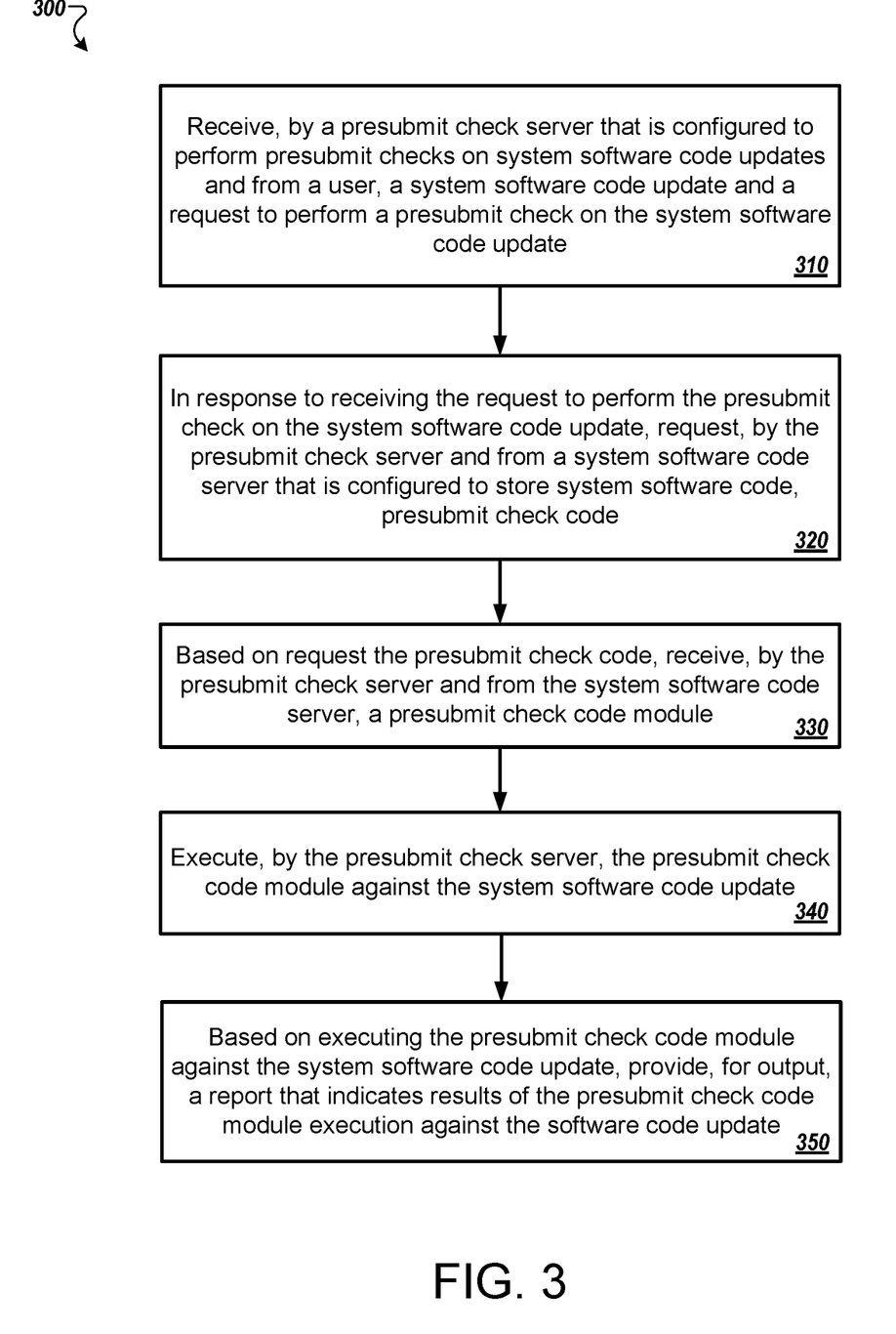
FIG. 3 illustrates an example process for testing open source software.

FIG. 3 illustrates an example process 300 for testing open source software. In general, the process 300 validates an operating by modifying a portion of the operating system to communicate with other portions of the operating system that may not have been accessible without modification. The process 300 will be described as being performed by a computer system comprising one or more computers, for example, the system 100 or the presubmit check server 108 as shown in FIG. 1.

The system receives, from a user, a system software code update and a request to perform a presubmit check on the system software code update (310). In some implementations, the system is configured to perform presubmit checks on system software code updates. The system may require that the user submit the system software code update for a presubmit check before submitting the system software code update to the system software code server. In some implementations, the system is a proprietary system that provides limited access to the public. The system may appear to be a black box where a user provides a system software code update for a presubmit check. The system outputs an indication whether the system software code update passed the presubmit check or failed the presubmit check or outputs a warning.

The system, in response to receiving the request to perform the presubmit check on the system software code update, requests, from a system software code server that is configured to store system software code, presubmit check code (320). In some implementations, the system software code server receives, from the user presubmit check code modules or presubmit check code updates. The system software code may be open source code. The presubmit check code may also be open source. The system software code server may receive updates to the presubmit check code and maintain the presubmit check code for presubmit checks from the public, such as users who also develop updates to the system software code.

The system, based on request the presubmit check code, receives, from the system software code server, a presubmit check code module (330). In some implementations, the presubmit check module is a script that the system interprets. The presubmit check module may be code that is configured to run in a sandbox. The presubmit check module may be a native binary or java that the system can execute. The presubmit check module may be a library that the presubmit checker 124 executes to implement a set of APIs. The system may be configured to execute any type of presubmit check code module. The system software code server may be configured to store presubmit check code modules of different types. For example, the system software code server may be configured to store scripts, code run in a sandbox, a native binary, and a library.

The system executes the presubmit check code module against the system software code update (340), for example, to determine whether the system software code update passes or fails one or more presubmit checks. In some implementations, the system executes the presubmit check code module against the system software code update in isolation, e.g. in isolation of other system software code updates. For example, the system may not link or relate a presubmit check of a system software code update to a presubmit check of another system software code update. The outcome of a presubmit check of a system software code update may not affect the presubmit check of another system software code update.

In some implementations, the system executes the presubmit check code module by performing the presubmit checks included in the presubmit check code module. In some implementations, the presubmit checks may include building, or compiling, the system software code update. For example, the system may apply the system software code update to the corresponding portion of the system software code. The system may generate a binary of the code that results from merging the system software code update to the system software code. The system may generate a build error or a compiling error if the system software code update fails the build test. In some implementations, the presubmit check may include a static analysis of the system software code update. For example, the system may apply a linter to identify any programming language error or stylistic errors. In some implementations, the presubmit checks may include a dynamic analysis of the system software code update. For example, the system may perform memory leak tests, use performance profiling, and other similar tests based on execution results from executing the system software code update that may be merged or not merged to the corresponding portion of the system software code. In some implementations, the presubmit checks may include an instrumentation analysis of the system software code update. For example, the system may perform code coverage tests and buffer overflow tests. The system may perform any of these tests on the system software code update that may be merged or not merged to the corresponding portion of the system software code.

The system, based on executing the presubmit check code module against the system software code update, provides, for output, a report that indicates results of the presubmit check code module execution against the software code update (350). In some implementations, the report includes an indication of whether the system software code update passed or failed the presubmit check. In some implementations, the system software code update may neither pass nor fail the presubmit check. In this instance, the system may output a report that includes a warning. In some implementations, the presubmit check may include multiple pass/fail/warning indications for each of the different checks that the system runs as part of the presubmit check. In some implementations, the results may include text that describes the results of the presubmit check.

In some implementations, the system may execute the presubmit check code module against the system software code update by generating a workflow model that includes multiple vertices that are connected by edges. Each vertex may represent a presubmit check and each edge may represent a dependency between connected presubmit checks. The system may execute a particular presubmit check. The system may determine that a result of the particular presubmit check is probabilistic. The system may, based on determining that a result of the particular presubmit check is probabilistic, execute a subsequent presubmit check that is connected to the particular presubmit check in the workflow model. In some implementations, the system, based on determining that a result of the particular presubmit check is probabilistic, provides, for output, the result of the particular presubmit check without waiting for a result of the subsequent presubmit check. In some implementations, the system, based on determining that a result of the particular presubmit check is probabilistic, provides, for output, the result of the particular presubmit check in a portion of a user interface that includes other results from other presubmit checks with probabilistic results.

Figure 4:
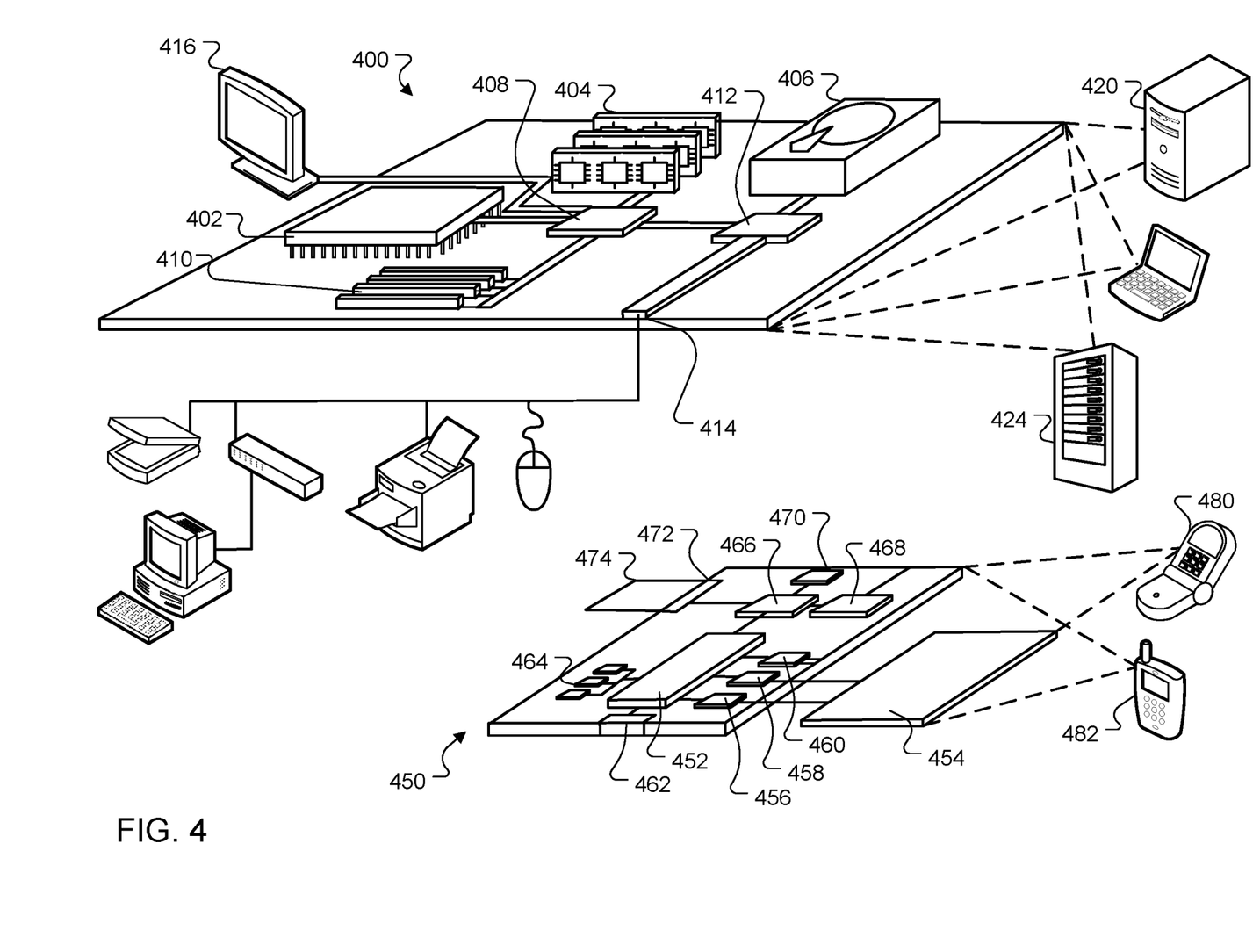
FIG. 4 illustrates an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver. In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

The invention claimed is:

1. A computer-implemented method comprising:
   receiving, from a user device and by a presubmit check server system that is configured to perform presubmit checks on system software code updates, a system software code update and a request to perform a presubmit check on the system software code update;
   in response to receiving the request to perform the presubmit check on the system software code update, requesting, by the presubmit check server system and from a system software code server system, presubmit check code, wherein the system software code server system is configured to store system software code and the presubmit check code;
   based on requesting the presubmit check code, receiving, by the presubmit check server system and from the system software code server system, a presubmit check code module, wherein the user device is associated with a user that is (i) authorized to update the presubmit check code module by way of the system software code server system and (ii) unauthorized to update the presubmit check code module by way of the presubmit check server system;

generating a workflow model that includes multiple vertices that are connected by edges, wherein each vertex represents a presubmit check and each edge represents a dependency between connected presubmit checks, and wherein the dependency represented by each edge is either a continue dependency or a stop dependency;

executing, by the presubmit check server system, the presubmit check code module against the system software code update by traversing the edges of the workflow model to determine whether the system software code update passes or fails one or more presubmit checks; and after traversing the edges of the workflow model, providing, for output, a report that indicates results of the presubmit check code module execution against the system software code update based on an analysis obtained by executing the presubmit check code module against the system software code update.

2. The method of claim 1, wherein executing, by the presubmit check server system, the presubmit check code module against the system software code update comprises:

executing, in isolation, the presubmit check code module against the system software code update.

3. The method of claim 1, wherein providing, for output, a report that indicates results of the presubmit check code module execution against the software code update comprises:

providing, for output, a results indicator that indicates a pass, a fail, or a warning and a message string.

4. The method of claim 1, wherein the presubmit check code module comprises:

a presubmit check script;
a presubmit check binary;
a presubmit check code that is configured to execute in a sandbox; or
a presubmit check library that is configured to implement one or more APIs.

5. The method of claim 1, wherein the system software code server system is configured to receive, from the user device, presubmit check code modules and presubmit check code updates, wherein the user is also unauthorized to submit presubmit check code modules to the presubmit check server system, and wherein the presubmit check server system is configured to allow at least one other user to modify the presubmit check code by way of the presubmit check server system.

6. The method of claim 1, wherein the system software code stored by the system software code server system is open source software code, and wherein the presubmit check code stored by the system software code server system is open source presubmit check code.

7. The method of claim 1, wherein executing, by the presubmit check server system, the presubmit check code module against the system software code update comprises:

executing a particular presubmit check of the workflow model;

determining that a pass result of the particular presubmit check is probabilistic in that the particular presubmit check relies on a signal or data that is unpredictable during the particular presubmit check; and based on determining that a pass result of the particular presubmit check is probabilistic, executing a subsequent presubmit check that is connected to the particular presubmit check in the workflow model.

8. The method of claim 7, wherein executing, by the presubmit check server system, the presubmit check code module against the system software code update comprises:

based on determining that a pass result of the particular presubmit check is probabilistic, providing, for output, the pass result of the particular presubmit check without waiting for a result of the subsequent presubmit check.

9. The method of claim 7, wherein executing, by the presubmit check server system, the presubmit check code module against the system software code update comprises:

based on determining that a pass result of the particular presubmit check is probabilistic, providing, for output, the pass result of the particular presubmit check in a portion of a user interface that includes other pass results from other presubmit checks with probabilistic results.

10. The method of claim 1, wherein the continue dependency indicates a first presubmit check to be executed when a preceding presubmit check produces a pass result, and wherein the stop dependency indicates a second presubmit check to be executed when the preceding presubmit check produces a fail result.

11. A system comprising:

one or more computers; and
one or more storage devices storing instructions that are operable, when executed by the one or more computers, to cause the one or more computers to perform operations comprising:

receiving, from a user device and by a presubmit check server system that is configured to perform presubmit checks on system software code updates, a system software code update and a request to perform a presubmit check on the system software code update;

in response to receiving the request to perform the presubmit check on the system software code update, requesting, by the presubmit check server system and from a system software code server system, presubmit check code, wherein the system software code server system is configured to store system software code and the presubmit check code;

based on requesting the presubmit check code, receiving, by the presubmit check server system and from the system software code server system, a presubmit check code module, wherein the user device is associated with a user that is (i) authorized to update the presubmit check code module by way of the system software code server system and (ii) unauthorized to update the presubmit check code module by way of the presubmit check server system;

generating a workflow model that includes multiple vertices that are connected by edges, wherein each vertex represents a presubmit check and each edge represents a dependency between connected presubmit checks, and wherein the dependency represented by each edge is either a continue dependency or a stop dependency;

executing, by the presubmit check server system, the presubmit check code module against the system software code update by traversing the edges of the workflow model to determine whether the system software code update passes or fails one or more presubmit checks; and after traversing the edges of the workflow model, providing, for output, a report that indicates results of the presubmit check code module execution against the system software code update based on an analysis obtained by executing the presubmit check code module against the system software code update.

12. The system of claim 11, wherein executing, by the presubmit check server system, the presubmit check code module against the system software code update comprises:
   executing, in isolation, the presubmit check code module against the system software code update.

13. The system of claim 11, wherein providing, for output, a report that indicates results of the presubmit check code module execution against the software code update comprises:
   providing, for output, a results indicator that indicates a pass, a fail, or a warning and a message string.

14. The system of claim 11, wherein the presubmit check code module comprises:
   a presubmit check script;
   a presubmit check binary;
   a presubmit check code that is configured to execute in a sandbox; or
   a presubmit check library that is configured to implement one or more APIs.

15. The system of claim 11, wherein the system software code server system is configured to receive, from the user device, presubmit check code modules and presubmit check code updates, wherein the user is also unauthorized to submit presubmit check code modules to the presubmit check server system, and wherein the presubmit check server system is configured to allow at least one other user to modify the presubmit check code by way of the presubmit check server system.

16. The system of claim 11, wherein the system software code stored by the system software code server system is open source software code, and wherein the presubmit check code stored by the system software code server system is open source presubmit check code.

17. The system of claim 11, wherein executing, by the presubmit check server system, the presubmit check code module against the system software code update comprises:
   executing a particular presubmit check of the workflow model;
   determining that a pass result of the particular presubmit check is probabilistic in that the particular presubmit check relies on a signal or data that is unpredictable during the particular presubmit check; and
   based on determining that a pass result of the particular presubmit check is probabilistic, executing a subsequent presubmit check that is connected to the particular presubmit check in the workflow model.

18. The system of claim 17, wherein executing, by the presubmit check server system, the presubmit check code module against the system software code update comprises:
   based on determining that a pass result of the particular presubmit check is probabilistic, providing, for output, the pass result of the particular presubmit check without waiting for a result of the subsequent presubmit check.

19. The system of claim 11, wherein the system software code comprises:
   software code for an operating system;
   software code for an application; or
   software code for a computer programming tool.

20. A non-transitory computer-readable medium storing software comprising instructions executable by one or more computers which, upon such execution, cause the one or more computers to perform operations comprising:
   receiving, from a user device and by a presubmit check server system that is configured to perform presubmit checks on system software code updates, a system software code update and a request to perform a presubmit check on the system software code update;
   in response to receiving the request to perform the presubmit check on the system software code update, requesting, by the presubmit check server system and from a system software code server system, presubmit check code, wherein the system software code server system is configured to store system software code and the presubmit check code;
   based on requesting the presubmit check code, receiving, by the presubmit check server system and from the system software code server system, a presubmit check code module, wherein the user device is associated with a user that is (i) authorized to update the presubmit check code module by way of the system software code server system and (ii) unauthorized to update the presubmit check code module by way of the presubmit check server system;
   generating a workflow model that includes multiple vertices that are connected by edges, wherein each vertex represents a presubmit check and each edge represents a dependency between connected presubmit checks, and wherein the dependency represented by each edge is either a continue dependency or a stop dependency;
   executing, by the presubmit check server system, the presubmit check code module against the system software code update by traversing the edges of the workflow model to determine whether the system software code update passes or fails one or more presubmit checks; and
   after traversing the edges of the workflow model, providing, for output, a report that indicates results of the presubmit check code module execution against the system software code update based on an analysis obtained by executing the presubmit check code module against the system software code update.

* * * * *